United States Patent
Hestekin et al.

(10) Patent No.: US 7,863,546 B2
(45) Date of Patent: Jan. 4, 2011

(54) AUTOMATED PREPARATION OF INFANT FORMULA AND CHILDREN'S BEVERAGES

(75) Inventors: Jamie Allen Hestekin, Fayetteville, AR (US); Kathryn Marie Baker, Glenview, IL (US); Chad David Galer, Glenview, IL (US); Colin Patrick Crowley, Wheeling, IL (US); Gerald Olean Fountain, Wilmette, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 940 days.

(21) Appl. No.: 11/616,749

(22) Filed: Dec. 27, 2006

(65) Prior Publication Data

US 2008/0160153 A1     Jul. 3, 2008

(51) Int. Cl.
*A47J 31/56* (2006.01)
*A47J 31/06* (2006.01)

(52) U.S. Cl. .................. 219/507; 219/497; 99/279; 99/281; 99/295

(58) Field of Classification Search .......... 99/279, 99/280, 281, 282, 283, 285, 295
See application file for complete search history.

(56) References Cited

U.S. PATENT DOCUMENTS

| | | | |
|---|---|---|---|
| 4,245,680 A | 1/1981 | Greenfield, Jr. et al. | |
| 4,484,515 A | 11/1984 | Illy | |
| 4,496,080 A | 1/1985 | Farber et al. | |
| 4,551,611 A | 11/1985 | Longo | |
| 4,653,390 A | 3/1987 | Hayes | |
| 4,744,291 A | 5/1988 | Wallin | |
| 4,775,048 A | 10/1988 | Baecchi et al. | |
| 4,899,911 A | 2/1990 | Rohde et al. | |
| 4,917,005 A | 4/1990 | Knepler | |
| 5,014,611 A | 5/1991 | Illy et al. | |
| 5,183,998 A | 2/1993 | Hoffman et al. | |
| 5,186,096 A | 2/1993 | Willi | |
| 5,265,520 A | 11/1993 | Giuliano | |
| 5,285,717 A | 2/1994 | Knepler | |
| 5,408,917 A | 4/1995 | Lussi | |
| 5,549,035 A | 8/1996 | Wing-Chung | |
| 5,639,023 A | 6/1997 | Hild et al. | |
| 5,704,275 A | 1/1998 | Warne | |
| 5,738,001 A | 4/1998 | Liverani | |
| 5,858,437 A | 1/1999 | Anson | |
| 5,992,298 A | 11/1999 | Illy et al. | |
| 6,000,317 A | 12/1999 | Van Der Meer | |
| 6,006,653 A | 12/1999 | Sham et al. | |
| 6,095,031 A | 8/2000 | Warne | |

(Continued)

FOREIGN PATENT DOCUMENTS

EP     0 771 542 A1     5/1997

(Continued)

*Primary Examiner*—Mark H Paschall
(74) *Attorney, Agent, or Firm*—Fitch, Even, Tabin & Flannery

(57) ABSTRACT

A beverage preparation machine is provided that is arranged and configured to dispense infant formula or children's beverages from a liquid concentrate with a consistent temperature in a receiving receptacle. In one form, the beverage preparation machine operates to provide a beverage in a receiving receptacle consistently and reliably at or near a predetermined final temperature based on the beverage type, such as formula or children's beverage, and independent of environmental conditions.

18 Claims, 9 Drawing Sheets

U.S. PATENT DOCUMENTS

| | | | |
|---|---|---|---|
| 6,142,063 A | 11/2000 | Beaulieu et al. | |
| 6,170,386 B1 | 1/2001 | Paul | |
| 6,173,117 B1 | 1/2001 | Clubb | |
| 6,178,874 B1 | 1/2001 | Joergensen | |
| 6,213,174 B1 | 4/2001 | Cook et al. | |
| 6,240,833 B1 | 6/2001 | Sham et al. | |
| 6,502,339 B1 * | 1/2003 | Shapiro | 40/560 |
| 6,612,224 B2 | 9/2003 | Mercier et al. | |
| 6,772,676 B2 | 8/2004 | Lassota | |
| 6,829,431 B1 | 12/2004 | Haven et al. | |
| 2002/0129712 A1 | 9/2002 | Westbrook et al. | |
| 2003/0146237 A1 | 8/2003 | Costa | |
| 2004/0197444 A1 | 10/2004 | Halliday et al. | |
| 2006/0011067 A1 * | 1/2006 | Spencer | 99/307 |
| 2007/0235555 A1 * | 10/2007 | Helf et al. | 239/102.2 |

FOREIGN PATENT DOCUMENTS

| | | |
|---|---|---|
| GB | 2 402 324 A | 12/2004 |
| WO | 90/01449 A1 | 2/1990 |
| WO | 98/27854 A1 | 7/1998 |
| WO | 02/085170 A2 | 10/2002 |
| WO | 02/085170 A3 | 10/2002 |
| WO | 03/082065 A1 | 10/2003 |
| WO | 2005/079361 A2 | 9/2005 |
| WO | 2006/014936 A2 | 2/2006 |
| WO | 2006/077259 A1 | 7/2006 |

* cited by examiner

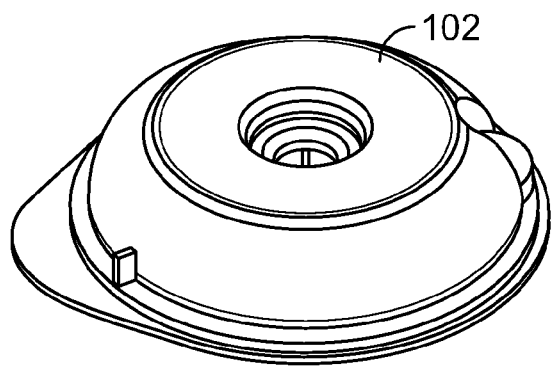
FIG. 12
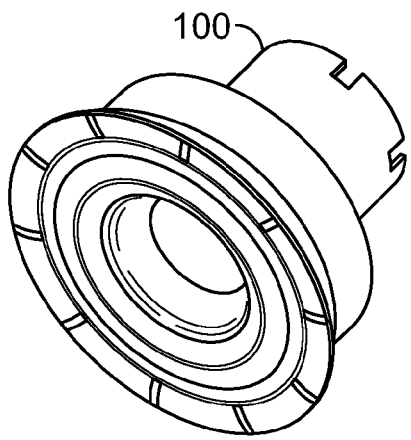 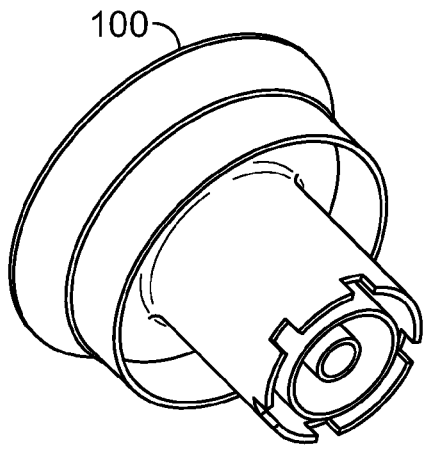
FIG. 13  FIG. 14
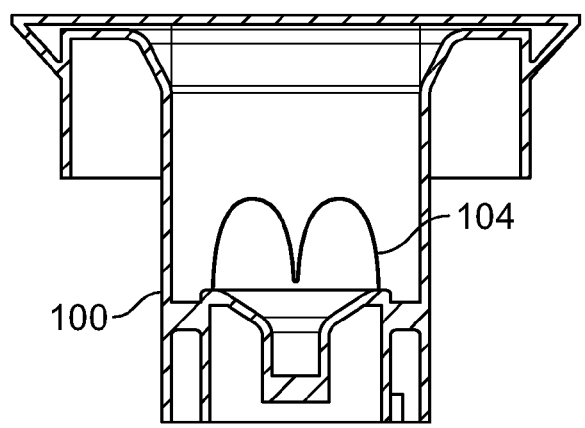
FIG. 15

AUTOMATED PREPARATION OF INFANT FORMULA AND CHILDREN'S BEVERAGES

FIELD

The invention relates to a beverage preparation machine, and more particularly, to an automated beverage preparation machine configured to dispense infant formula and children's beverages.

BACKGROUND

Infant formulas such as Similac™ and Enfamil™ and other children's beverages are typically available for sale in concentrated liquid, powder, or ready-to-drink forms. Each beverage or formula type, however, has shortcomings associated with its preparation and/or use. For example, the ready-to-drink beverages or formulas tend to be more expensive and require additional space in the cupboard or refrigerator due to higher water content. The concentrate and powder formulas/beverages, on the other hand, require additional preparation steps, such as dilution or reconstitution (preferably with water), that can be inconvenient to the consumer. Moreover, if too much water is used, then the diluted formula or beverage may not provide sufficient vitamins or nutrients. With powder reconstitution, if the formula/beverage is not mixed properly, the final product may also include undissolved clumps of formula. As a result, diluting, reconstituting, and/or mixing formula/beverage is often a challenging task to complete correctly or efficiently, especially late at night when a baby or toddler is crying or when other children are also seeking attention.

Infant formulas are typically served warm after a heating step has been undertaken to achieve a beverage that is generally around body temperature (i.e., about 95 to about 105° F.). To achieve such temperature range, the heating must be carried out with a fairly high degree of precision. Formula that is warmer than about 105° F., for example, may be too hot for infants or toddlers to consume safely.

Formula is commonly heated in a microwave, in a water bath on a stove, or in a steam heating device. Heating by these mechanisms can provide variable results, and often each prepared serving must be heated through trial and error to reach the desired temperature. Moreover, if the formula is warmed above the desired temperatures, chilling or cooling at room temperature may be required before the formula is at an appropriate temperature suitable for safe consumption by an infant. This trial and error heating/cooling is time consuming and can become burdensome—especially if it is late at night, the baby to be fed is crying, or other children are creating a distraction.

UK Patent application No. GB 2 402 324A and U.S. Pat. Nos. 6,829,431 B1 and 6,173,117 B1 describe machines for automated preparation of ready-to-drink infant formula from a dehydrated or powdered form. In one machine, the correct number of scoops must still be pre-measured into dosing chambers for later use. In other machines, bulk powders may be dosed through automated gravimetric dosing receptacles; however, the powder is still subject to environmental effects prior to its use. Humidity, for example, can cause bulk powder exposed to the atmosphere to clump, which can affect the proper mixing and dissolving of the formula.

Accordingly, there is a need for a better system for preparing infant formula at appropriate temperatures with minimal inconvenience.

SUMMARY

A beverage preparation machine is provided that is arranged and configured to dispense infant formula or children's beverages with a consistent temperature in a receiving receptacle generally independent of environmental conditions. For example, the beverage preparation machine operates to provide a beverage in a receiving receptacle consistently and reliably at or near a predetermined final temperature based on the beverage type (i.e., formula or children's beverage) and/or independent of input temperatures of an aqueous medium or a concentrate of the desired beverage. For an infant formula, the predetermined final temperature of the formula in the receiving receptacle is preferably about 95° F. to about 105° F. For other children's beverages and liquid-phase foods, such as hot chocolate, dairy beverages, teas, juices, cider, soups, and the like, the predetermined final temperature of the beverage in the receiving receptacle is about 115° F. to about 125° F. By one approach, the beverage is provided at the final beverage temperature within plus or minus about 5° F.

In one form, the machine includes a tank sized to contain at least a predetermined volume of an aqueous medium at a first temperature; a chamber configured to receive a cartridge containing a predetermined volume of a liquid concentrate at a second temperature; a metering device to form a beverage by diluting the predetermined volume of liquid concentrate with the predetermined volume of aqueous medium; and a discharge arranged to direct the beverage into a receiving receptacle. The machine also includes a controller operative to provide the final beverage temperature based on a ratio of the predetermined volume of aqueous medium to the predetermined volume of liquid concentrate such that the beverage in the receiving receptacle will consistently and reliably be delivered at or near a predetermined final temperature within plus or minus about 5° F.

In one aspect, the machine prepares the infant formula or child's beverage from a liquid concentrate so that it has a predetermined final temperature within the receiving receptacle, regardless of the temperature of the incoming aqueous medium, the dilution ratio, or temperature of the concentrate within the cartridge prior to dilution. In this manner, the infant formula or children's beverage is prepared consistently and at a known temperature within the receiving receptacle so that it may be immediately fed to an infant or toddler.

BRIEF DESCRIPTION OF THE DRAWINGS

FIGS. 11 and 12 are perspective views of an exemplary cartridge;

FIGS. 13 and 14 are perspective views of an alternative cartridge inner member for use in the beverage preparation machine of FIG. 1;

FIG. 15 is a cross-sectional view of the alternative cartridge inner member of FIGS. 13 and 14;

DETAILED DESCRIPTION

Figure 1:
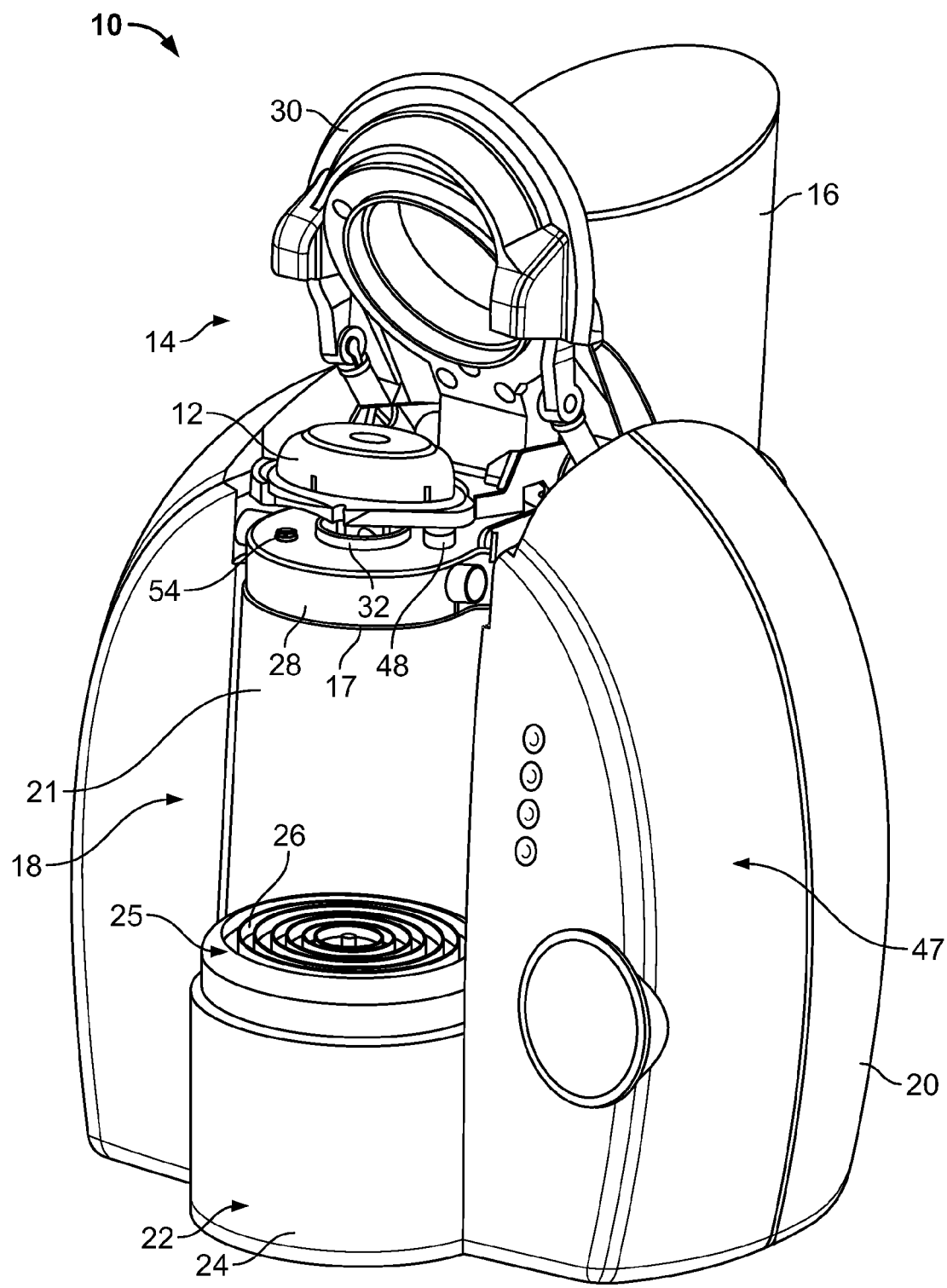
FIG. 1 is a perspective view of an exemplary beverage preparation machine suitable to dispense infant formula and children's beverages.

Referring to FIG. 1, there is illustrated an exemplary beverage preparation machine 10 that prepares a single serving of infant formula at a predetermined temperature within a receiving receptacle that is suitable for consumption by infants or toddlers. The machine 10 is preferably capable of also preparing other children's beverages in the same way. The machine 10 utilizes beverage cartridges 12 that contain a single serving of infant formula or children's beverage in the form of a concentrated liquid. In use, the beverage cartridge 12 is first inserted into a cartridge head 14 located on an upper portion of the machine. To prepare the beverage, the machine 10 then passes an aqueous medium, preferably water, from a holding tank or reservoir 16 through the cartridge 12 in order to dilute the liquid concentrate to the desired consistency of the formula or beverage. The machine 10 then dispenses the formula or beverage through a discharge 17 into an appropriate receiving receptacle 19, such as a baby bottle, cup, or other container, within a dispensing station 18 located under the cartridge head 14.

The machine 10 prepares the infant formula or child's beverage from a liquid concentrate so that it has a predetermined final temperature within the receiving receptacle, regardless of a variety of factors, such as the temperature of the incoming aqueous medium, the dilution ratio, and/or the temperature of the concentrate within the cartridge prior to dilution. In this manner, the infant formula or children's beverage is prepared consistently and at a known temperature within the receiving receptacle so that it may be immediately fed to an infant or toddler. For example, even if the aqueous medium in the holding tank 16 has been heated or chilled, this incoming fluid source will preferably not affect the temperature of the beverage in the receiving receptacle. Likewise, if the cartridge 12 has been heated or chilled, the temperature profile of the concentrate in the cartridge 12 will preferably also not affect the final beverage temperature in the receiving receptacle. By one approach, the predetermined final temperature within the receiving receptacle is within plus or minus 5° F. of a desired temperature.

The machine 10 and cartridges 12, therefore, eliminate the cumbersome and time consuming trial and error steps of powder dosing, diluting, reconstituting, mixing, and heating of current infant formulas. The cartridge 12 provides a pre-measured liquid concentrate for a desired formula volume. The cartridges of liquid concentrate are generally not affected by environmental factors, so that the machine 10 can consistently prepare the infant formula or child's beverage without the concern of product clumping. The machine 10 automatically dilutes the concentrate with a desired amount of the aqueous medium, and prior to the combination with the concentrate, the aqueous medium is heated to a predetermined temperature necessary to obtain the desired final temperature in the receiving receptacle.

A parent, therefore, can prepare an infant formula or other children's beverage while at the same time paying attention to a crying child or attend to other distractions. Once the machine 10 dispenses the beverage, the parent may immediately feed the beverage to the child with confidence the beverage is properly mixed and the temperature within the receiving receptacle (i.e., baby bottle or cup, etc.) is suitable for infants or toddlers, as the case may be.

The predetermined temperature of the aqueous medium selected to produce a final beverage temperature in the receiving receptacle is preferably based on a number of factors. For example, the temperature of the aqueous medium may be based on the type of beverage, the dilution ratio, the incoming aqueous medium temperature (i.e. tank temperature), the temperature of the liquid concentrate in the cartridge 12, the size of the beverage to be dispensed, among other factors. For an infant formula, the predetermined final temperature of the formula in the receiving receptacle is preferably about 95° F. to about 105° F. For other children's beverages and liquid-phase foods, such as hot chocolate, dairy beverages, teas, juices, cider, soups, and the like, the predetermined final temperature of the beverage in the receiving receptacle is about 115° F. to about 125° F.

Beverage Preparation Machine

Figure 2:
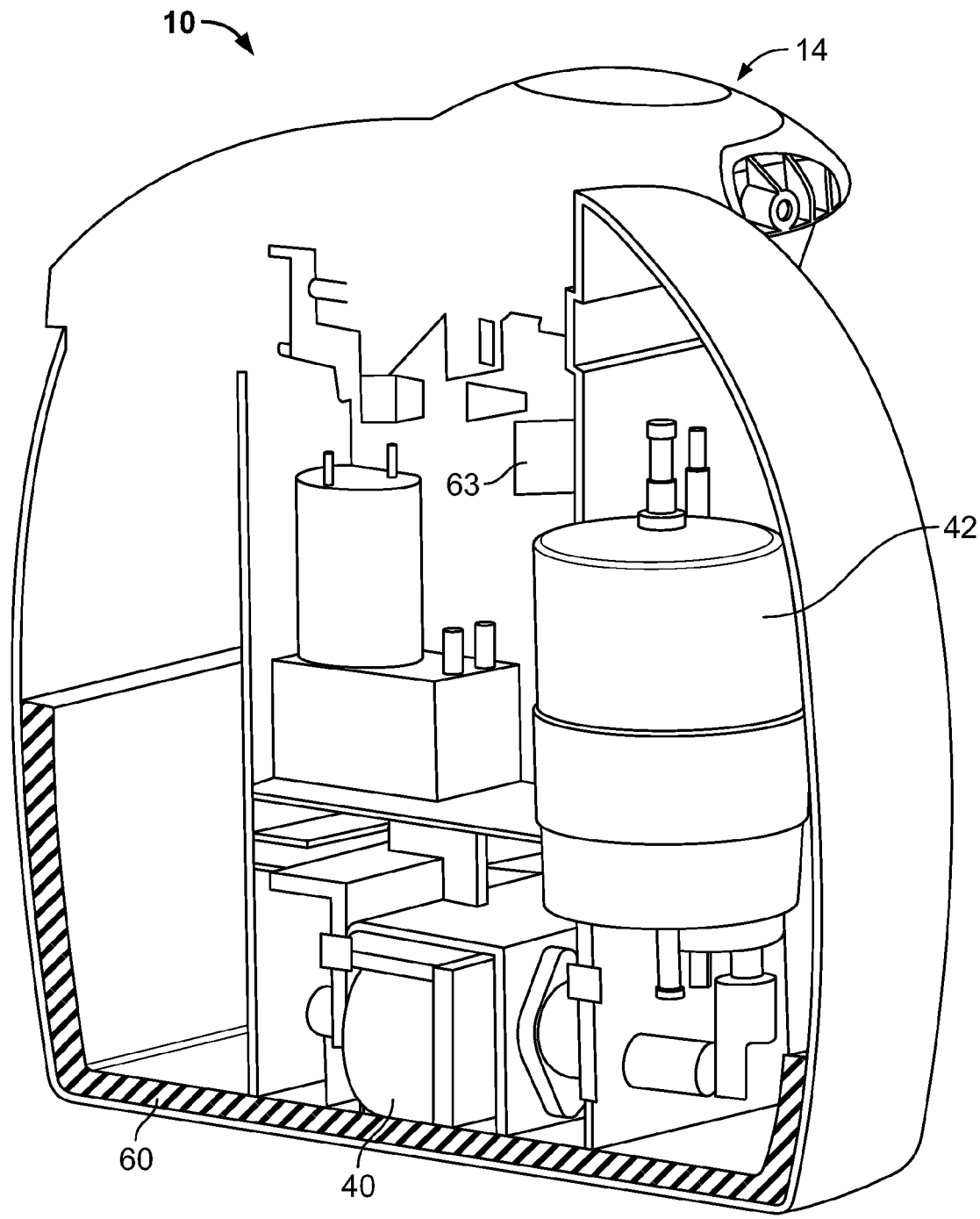
FIG. 2 is a cut-away view of the beverage preparation machine of FIG. 1.
Figure 3:
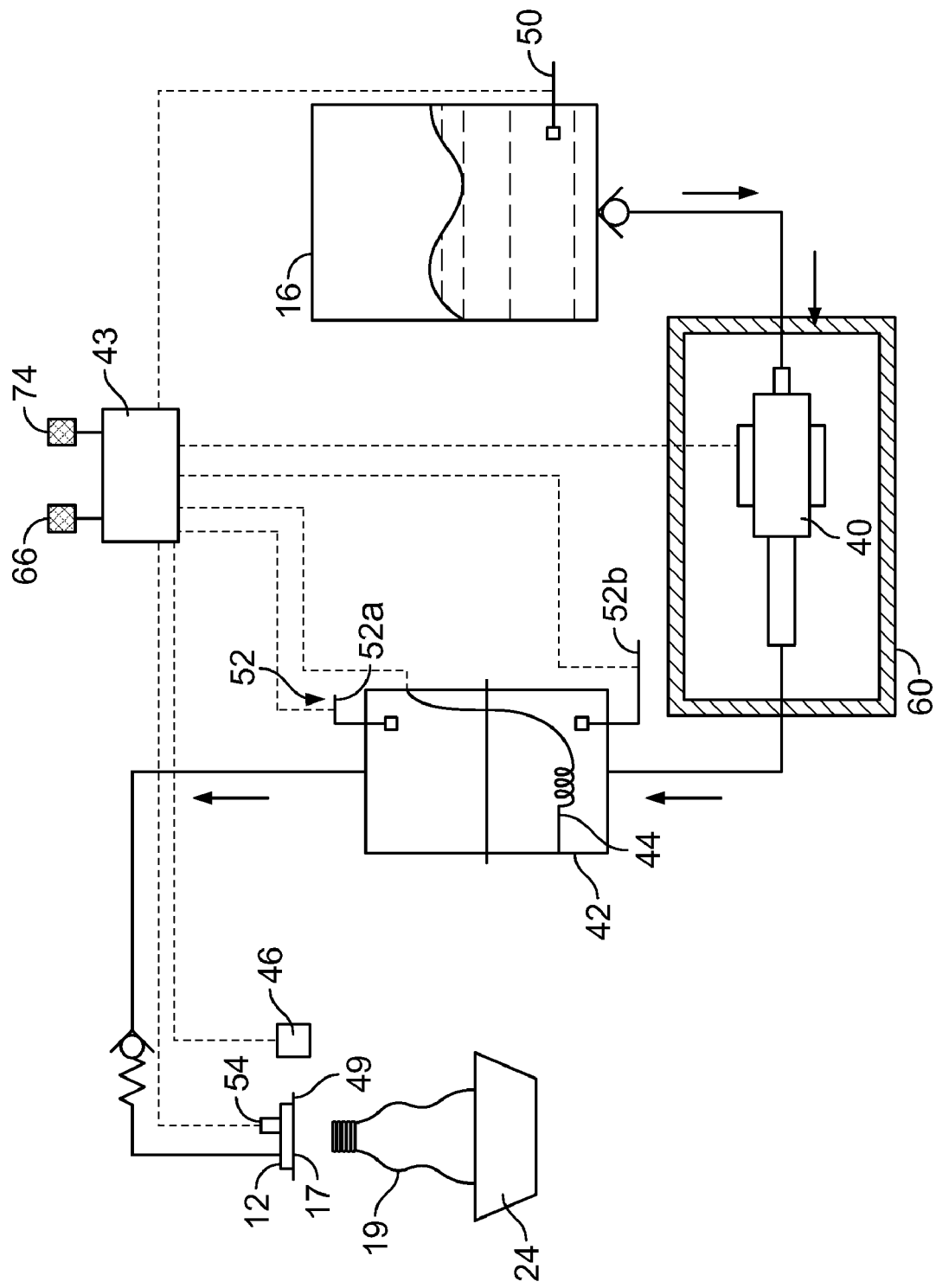
FIG. 3 is a schematic view of the beverage preparation machine of FIG. 1.

Referring to FIGS. 1 to 3, the exemplary beverage preparation machine 10 will be described in more detail. The machine 10 includes a housing 20 with the cartridge head 14 on an upper portion thereof and the dispensing station 18 positioned below the cartridge head 14. The dispensing station is formed from a recess 21 within the housing 20. The dispensing station 18 preferably includes a variable height adjustment 25 so as to accommodate receiving receptacles of different heights. For example, the dispensing station 18 includes a receptacle stand 22 that defines a hollow drip tray 24 to receive spills or overflow. On an upper surface of the receptacle stand 22 is an adjustable height grill 26 that may be raised or lowered relative to the cartridge head 14 to accommodate varying sizes of receptacles. The grill 26 also preferably defines openings that lead into the drip tray 24 to permit beverage spills and overflow to be collected within the drip tray 24.

The cartridge head 14 is preferably a clam-shell device that includes a fixed lower jaw 28 and a movable upper jaw 30, which is configured to pivot relative to the lower jaw 28 to open and close the head 14. For instance, to receive a cartridge 12, the upper jaw 30 is pivoted upwardly to open the head 14 into a cartridge receiving position as shown in FIG. 1. The cartridge 12 may then be inserted into the head 14. The upper jaw 30 is then pivoted downwardly to close the head 14 with the cartridge secured therein. Once closed, the head 14 includes a piercing mechanism 32 that provides an inlet and outlet to the cartridge 12, which are preferably on the same side of the cartridge. Further details concerning a preferred beverage preparation machine may be found in U.S. application Ser. No. 10/763,444, which is incorporated herein by reference in its entirety.

As illustrated in FIGS. 2 and 3, the machine 10 includes a metering device or pump 40 that directs the aqueous medium from the holding tank 16 to a heater 42. A controller 43 then determines the correct temperature of the aqueous medium in the heater 42, and energizes a heating source 44 to heat the aqueous medium to the predetermined temperature necessary to achieve the desired final beverage temperature in the receiving receptacle. Once heated, the aqueous medium at the predetermined temperature then flows from the heater 42 through the cartridge 12 into the receiving receptacle 19, shown as an exemplary baby bottle in FIG. 3.

To dispense beverage into the receptacle 19 at the desired final beverage temperature, the machine 10 considers a number of a factors. One factor is the type of liquid concentrate in the cartridge. As previously discussed, it is preferred that the final beverage temperature of an infant formula range from about 95° F. to about 105° F., and the final beverage temperature of a child's beverage range from about 115° F. to about 125° F. Temperatures above these ranges are generally considered unsafe for infants or children.

The beverage type can be determined via a cartridge recognition device 46, which can comprise a variety of different forms. For example, the cartridge recognition device 46 can be a user interface 47 for manual inputs (FIG. 1), a bar code reader 48 (FIG. 1) that automatically scans and reads a bar code 49 (FIG. 3) on the cartridge 12, or other device that reads various identifying indicia on the cartridge 12.

Once the type of beverage is determined, the machine 10 then can set various operating parameters, which may be varied based on other environmental parameters, to achieve the desired final beverage temperature within the receiving receptacle. Such operating parameters preferably include, for example: dilution ratio (i.e., volume of aqueous medium to volume of liquid concentrate in the cartridge 12), temperature of the aqueous medium in the heater 42, pump speed, and/or amount of beverage to be dispensed. The machine 10 may also vary other operating parameters.

Another factor the machine 10 may consider in order to dispense the beverage in the receptacle 19 at the desired final beverage temperature is one or more environmental conditions. Exemplary environmental conditions the machine 10 could measure include: temperature of the aqueous medium in the tank 16, ambient room temperatures, receiving receptacle temperature, and/or temperature of the liquid concentrate in the cartridge 12. Other environmental conditions that could affect the final beverage temperature could also be monitored. Then, the machine 10 would preferably optimize the operating parameter values, such as those discussed above (i.e., dilution ration, heater temperature, pump speed, and/or amount of beverage), based on the environmental measurements in order to deliver product at the correct temperature in the receiving receptacle 19.

As illustrated in Table 1 below, the dilution ratio, temperature of the aqueous medium, type of beverage, and amount of beverage will generally affect the final temperature of the beverage within the receiving receptacle in some instances. For example, for a 1:1 ratio of aqueous medium to infant formula concentrate, it is preferred to have a temperature of aqueous medium of about 50° C. to about 60° C., and most preferably about 55° C. (131° F.). For a 3:1 ratio of aqueous medium to infant formula concentrate, it is preferred to have a temperature of aqueous medium of about 40° C. to about 50° C., and most preferably about 45° C. (113° F.). For a 6:1 ratio of aqueous medium to chocolate beverage concentrate, it is preferred to have a temperature of aqueous medium of about 50° C. to about 60° C., and most preferably about 55° C. (131° F.). For a 3:1 ratio of aqueous medium to milk drink concentrate, it is preferred to have a temperature of aqueous medium of about 57° C. to about 67° C., and most preferably about 62° C. (143.6° F.). And, for a 3:1 ratio of aqueous medium to juice/cider concentrate, it is preferred to have a temperature of aqueous medium of about 50° C. to about 60° C., and most preferably about 55° C. (131° F.). The above ratios and temperatures are provided as examples of several embodiments of the beverages that the machine 10 is configured to dispense. Other ratios and temperatures are also possible depending on the particular beverage and application.

TABLE 1

Examples of Final Beverage Temperature in Receiving Receptacle with changes in heated water temperature and dilution ratio. (These examples assume a cartrdige temperature of about 70° F.)

| Beverage Type | Dilution Ratio | Water Temp (° C./° F.) | Parts Water | Parts Concentrate | Beverage Temperature in Receiving Receptacle (° C./° F.) |
| --- | --- | --- | --- | --- | --- |
| Infant Formula | 1:1 | 45/113 | 2 | 2 | 33.5/92.3 |
| 4 oz | 1:1 | 55/131 | 1 | 1 | 38.5/101.3 |
|  | 1:1 | 65/149 | 1 | 1 | 43.5/110.3 |
| Infant Formula | 3:1 | 45/113 | 6 | 2 | 39.3/102.7 |
| 8 oz | 3:1 | 55/131 | 6 | 2 | 46.8/116.2 |
|  | 3:1 | 65/149 | 6 | 2 | 54.3/129.7 |
| Children's | 6:1 | 45/113 | 6 | 1 | 41.7/107.1 |
| Chocolate | 6:1 | 55/131 | 6 | 1 | 50.3/122.5 |
| Beverage | 6:1 | 65/149 | 6 | 1 | 58.9/137.9 |
| Children's Dairy | 3:1 | 45/113 | 6 | 2 | 39.3/102.7 |
| Beverage | 3:1 | 55/131 | 6 | 2 | 46.8/116.2 |
|  | 3:1 | 62/143.6 | 3.7 | 1.76 | 49.1/120.4 |
| Juice/Cider | 3:1 | 45/113 | 4 | 1 | 40.4/104.7 |
|  | 3:1 | 55/131 | 4 | 1 | 48.4/119.1 |
|  | 3:1 | 60/140 | 4 | 1 | 52.2/126.3 |

To monitor the various temperatures, the machine 10 may include a variety of temperature sensors. For example, referring to the schematic of FIG. 3, the machine 10 may includes at least a tank temperature sensor 50 to measure the temperature of the aqueous medium in the tank 16, a heater sensor 52 to measure the temperature of the aqueous medium in the heater 42, and a cartridge sensor 54 to measure the temperature of the liquid concentrate in the cartridge 12 prior to dilution. Preferably, the heater sensor 52 comprises a pair of thermocouples 52a and 52b to provide additional safety measures to minimize, and preferably, prevent overheating the aqueous medium. In addition, the machine 10 may also include an ambient room temperature sensor, and/or a sensor to measure the temperature of the receiving receptacle.

The cartridge sensor 54 may be disposed within the cartridge head 14 and positioned to contact an exterior of the cartridge 12 when the head 14 is closed. For instance, the sensor 54 may be positioned to contact a top or side surface of the cartridge, or may be positioned beneath the cartridge 12 to measure the liquid concentrate temperature through a foil laminate on the lower side of the cartridge 12, which may be preferable due to the lower thermal resistivity of the foil laminate. Alternatively, the sensor 54 may pierce the cartridge 12 so as to be in direct contact with the liquid concentrate. If the sensor contacts the top or side of the cartridge, it is generally disposed at a location such that concentrated liquid is on the opposite side of the cartridge wall at that location. In yet another alternative form, the sensor 54 may be positioned on or within the cartridge 12 such that it may read the liquid concentrate temperature therein and also provide such information to the controller 43. In one form, the cartridge sensor 54 would be located in an upper cavity of the cartridge head; such as, for example, on the movable upper jaw 30 to sense the temperature of the outer wall of the cartridge 12.

Optional Features for Beverage Preparation Machine

The exemplary beverage preparation machine 10 may also include a number of optional features that render the machine 10 more suitable for use in a nursery or child's room.

For example, the machine 10 may include an insulating material 60 to render the machine quieter so not to disturb a sleeping infant or child, for example. As illustrated in FIGS. 2 and 3, the insulating material 60 may be positioned around the pump 40, on inner surfaces of the machine housing 20 (i.e., side and bottom inner housing surfaces), or on outer surfaces of the machine housing 20. The insulating material 60 may be foam or other sound and/or vibration absorbing material.

Figure 4:
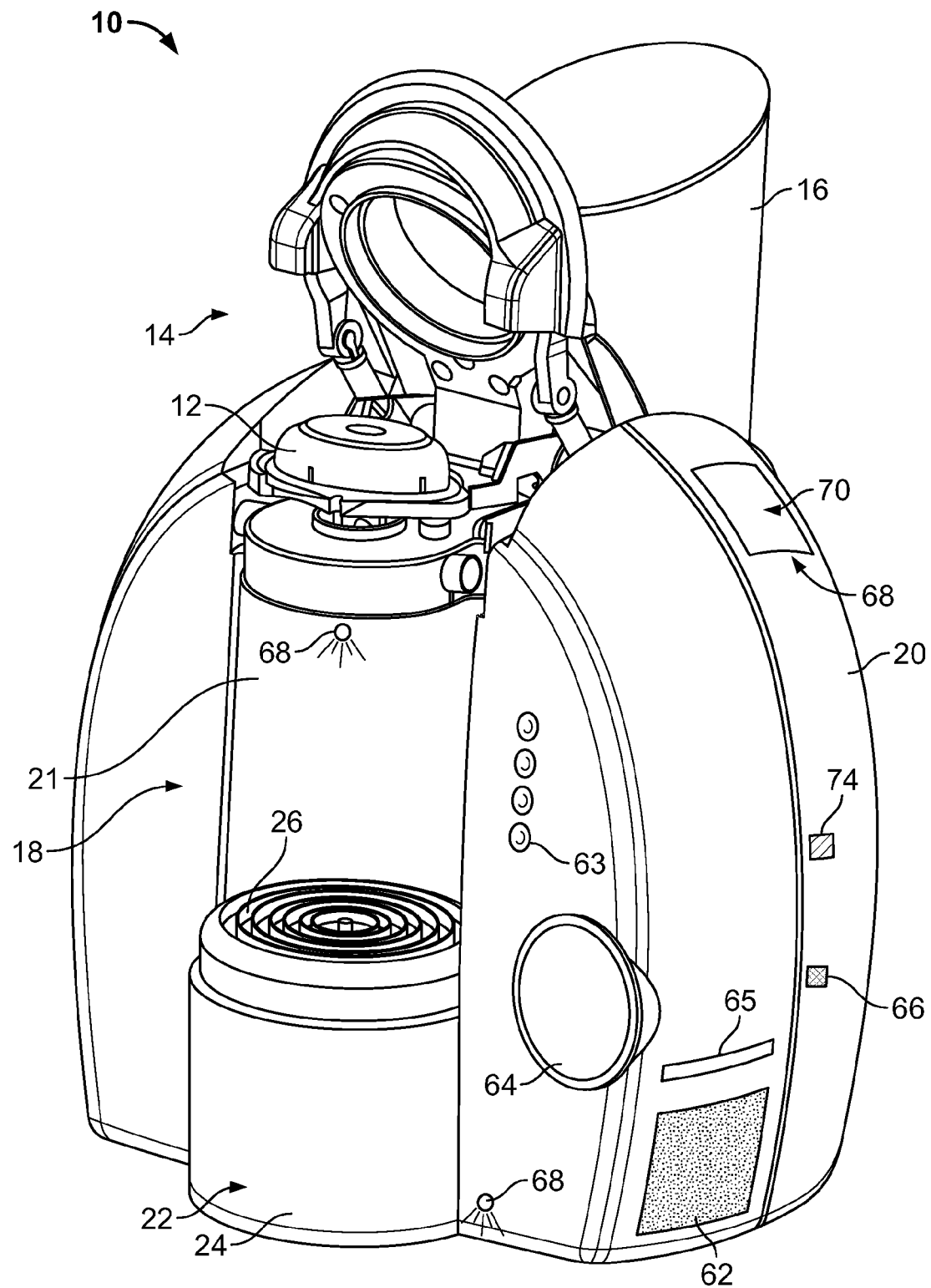
FIG. 4 is a perspective view of the beverage preparation machine of FIG. 1.

The machine 10 may also include the ability to provide sounds via an audible device 62 or other sound producing device having an external speaker as shown in FIG. 4. By producing sound through a speaker, the machine can mask any noise generated by the machine pump, heater, or other part that may disturb infants or children. In addition, with the ability to generate sounds, the machine 10 can also play soothing music, lullabies, learning songs (i.e., ABC's) or other sounds (i.e., waves, water, winds, etc) to help comfort infants or children.

The sounds may be preloaded and stored within an appropriate storage device 63 (FIG. 2), such as a memory disk, hard drive, or other storage device within the machine. On the other hand, the machine 10 may also include a slot 65 (FIG. 4) configured to receive the sounds. For example, the slot 65 may be a tape deck, a CD player, a USB port, an Ethernet port, a phone line connection, or other data receiving/providing ports. In this manner, the machine 10 is configured to receive sounds through a variety of mechanisms, such as cassette tapes, compact disks, memory disks, MP3 players, computers, laptops, data cartridges, or other data holding devices.

The sounds can be activated via a variety of inputs. For instance, the sounds can be activated by pushing an on/off button 63 that only controls the audible device 62 or by pressing a beverage start/stop button 64 so that sounds are generated at the same time the machine 10 is producing a beverage. The sounds can also be activated automatically when the data holding device is inserted into the slot 65. In addition, the machine 10 may include a sensor 66 operative to sense ambient noise, such as a baby crying. When the machine senses such a noise, the audible device 62 is operative to be automatically turned on to play predetermined sounds, such as a lullaby, music, voices, etc. to sooth the infant back to sleep.

Referring to FIGS. 4 to 7, the machine 10 may also include one or more illumination sources 68, such as one or more LEDs, light bulbs, or other light generating sources. In one form, the illumination source 68 is positioned on the housing 20 as a night light such that it may gently illuminate an area surrounding the machine 10. In another form, the illumination source 68 is positioned within the housing recess 21 so that it may direct illumination within the dispensing station 18. In this manner, a user may operate the machine 10 and view the beverage being dispensed without having to turn on a room light, which may disturb an infant or child.

Figure 5:
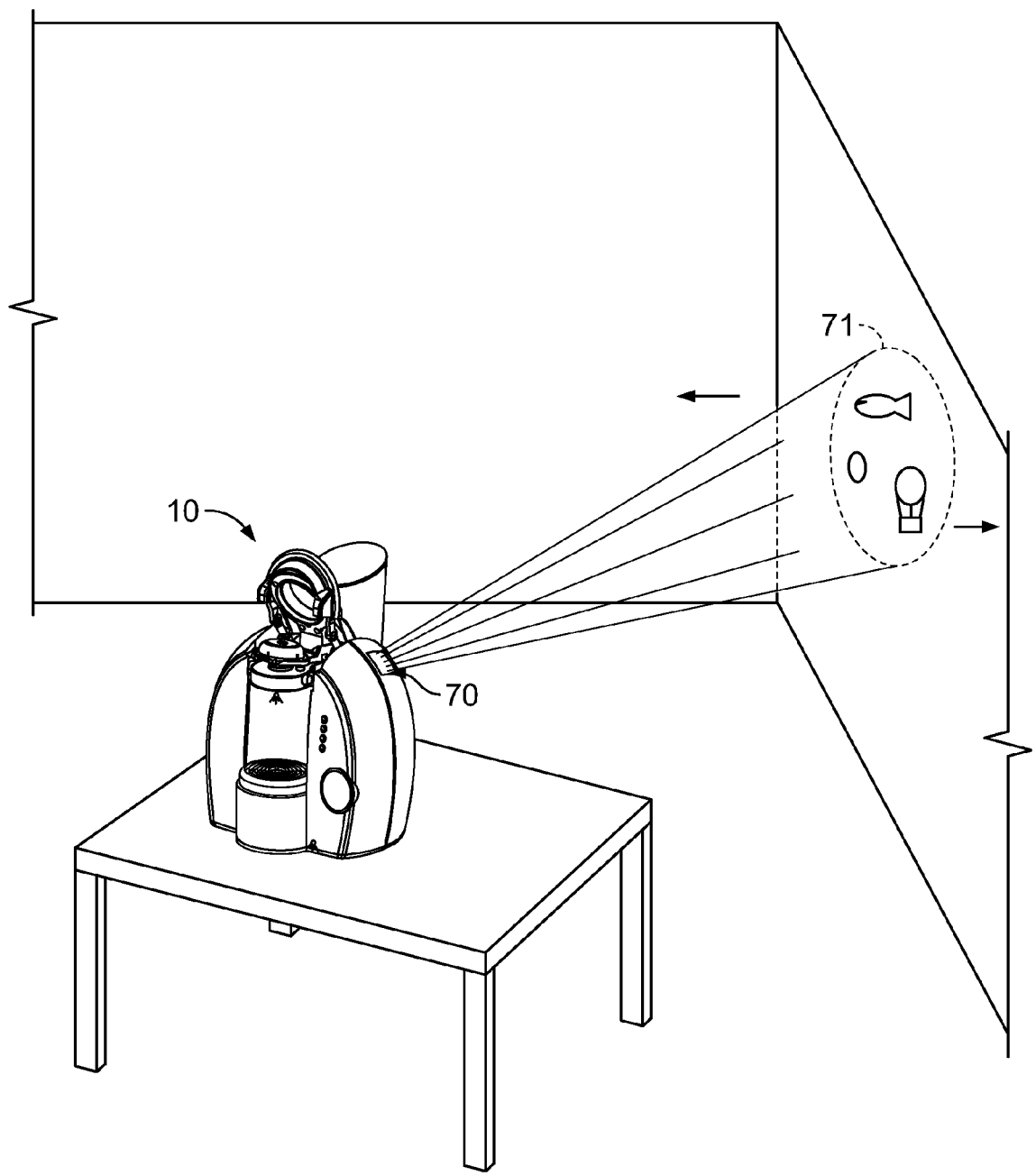
FIG. 5 is a perspective view of the beverage preparation machine of FIG. 1 shown in an exemplary environment.
Figure 6:
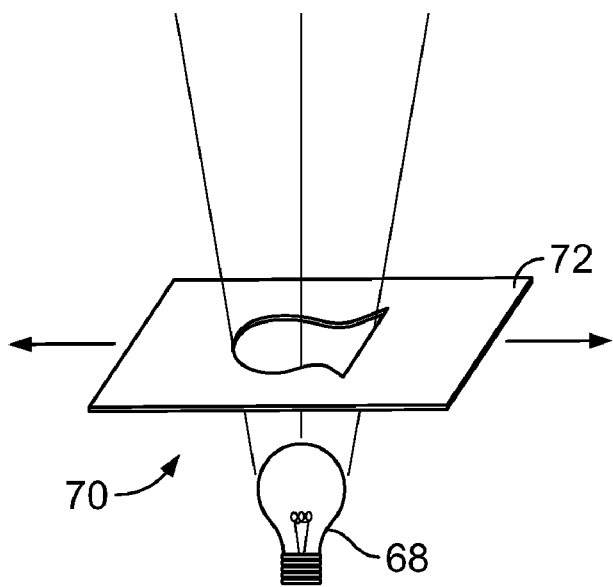
FIG. 6 is a schematic view of a portion of the beverage preparation machine of FIG. 1.
Figure 7:
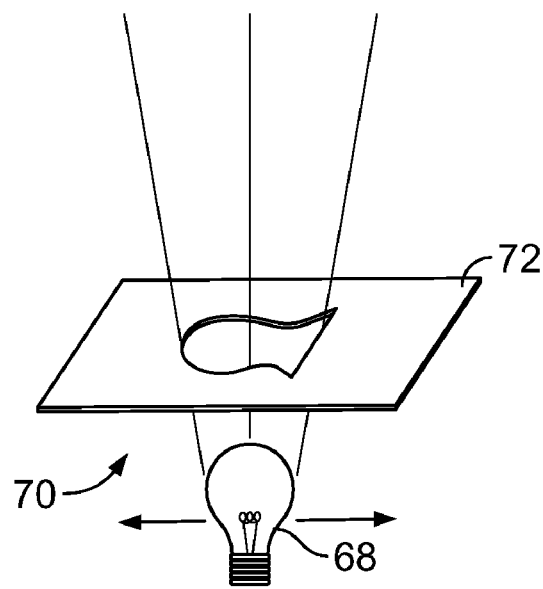
FIG. 7 is a schematic view of an alternative portion of the beverage preparation machine of FIG. 1.
Figure 8:
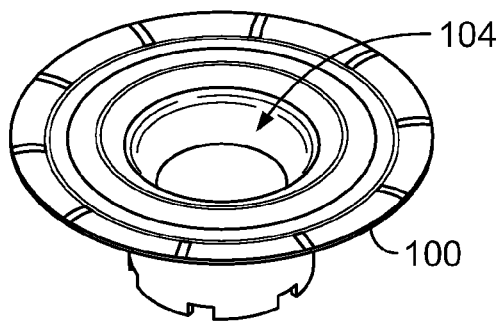
FIGS. 8 and 9 are perspective views of an exemplary cartridge inner member for use in the beverage preparation machine of FIG. 1.
Figure 9:
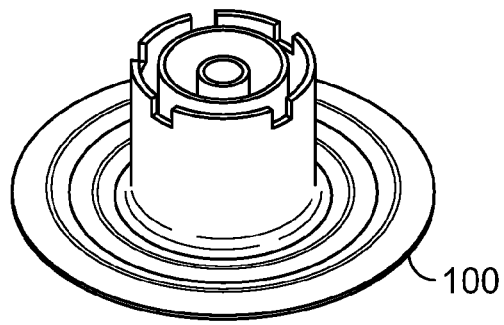
Figure 10:
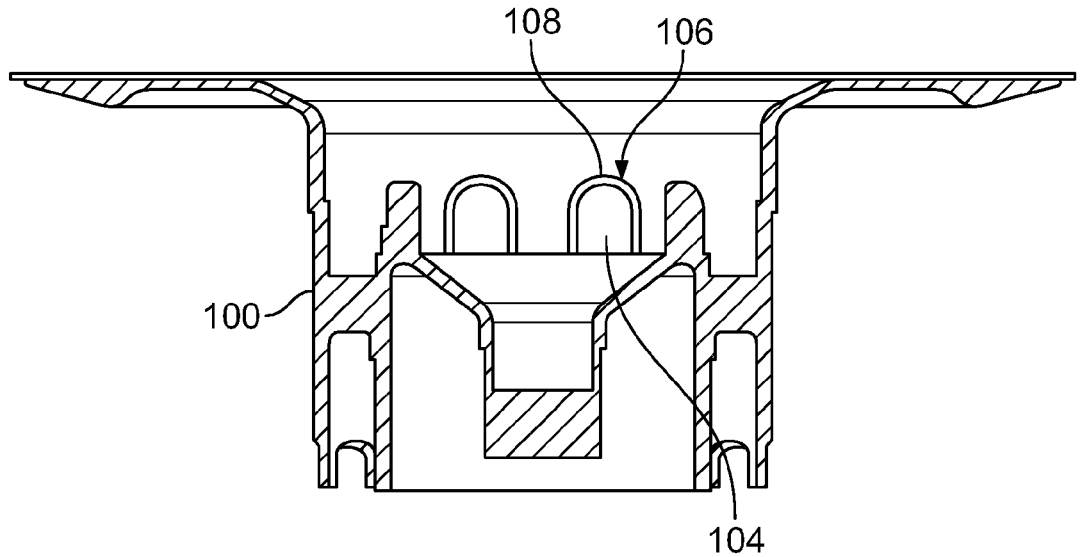
FIG. 10 is a cross-sectional view of the cartridge inner member of FIGS. 8 and 9.
Figure 11:
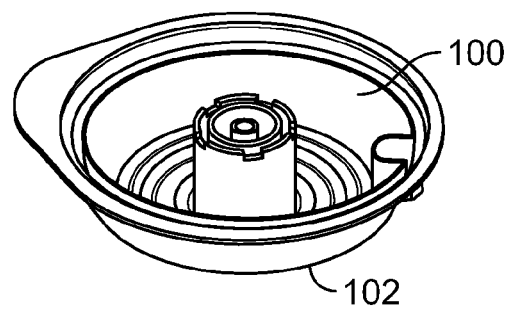
Figure 16:
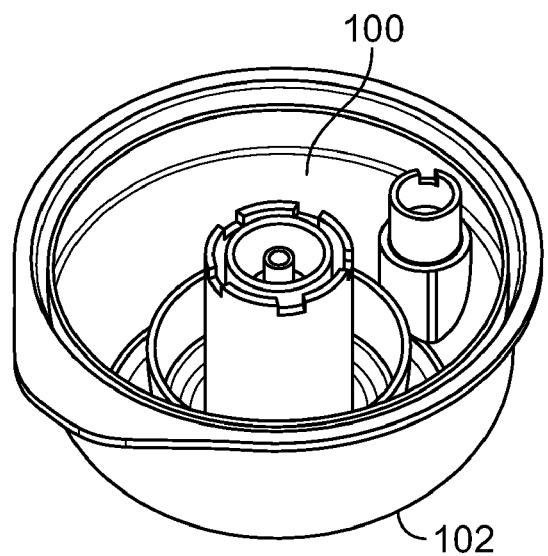
FIG. 16 is a perspective view of an exemplary cartridge.

In yet another form, the illumination source 68 is part of a light mobile 70 that is positioned to direct illumination or other images onto a surface of a room, such as a wall or ceiling, in which the machine 10 is placed. For instance, as shown in FIG. 5, the light mobile 70 projects an image 71 onto the room surface. The image 71 may include patterns, objects, photos, silhouettes, and the like. If desired, the image 71 may also move. For example, a moving image 71 may be created by projecting the light generated from the illumination source 68 through a moving stencil 72 (FIG. 6), or by moving the illumination source 68 behind a stationary stencil 72 (FIG. 7). Of course, both stationary and moving images can be produced through other mechanisms and sources.

The housing 20 of the machine 10 may also be removable such that it may be customizable for each user. In this regard, the cover 20 may include baby friendly color schemes so that the exterior may be more suitable for a nursery or toddler room. As the infant grows older, the housing 20 having an infant theme may be replaced with a housing having a different color scheme, style, or shape that is more appropriate for the child's age, for example. Each separate housing 20 may also include a variety of different colors, themes, pictures, stories, animals, blocks, characters, and the like. In this manner, the machine 10 is adaptable to fit different rooms, ages, genders, and can be customizable as these factors change over the years. When the child has reached an age to consume coffee and tea beverages, the cover 20 can be replaced with a more typical kitchen-appliance-type cover so that the machine 10 can be used in the kitchen, for example, with cartridges 12 that are designed to dispense coffee-type beverages.

When preparing a beverage for an infant, it is often important to be able to prepare it immediately. As a result, the machine 10 may also include an additional ambient noise sensor 74 (FIG. 4) operative to sense loud noises, such as a baby crying, and pre-activate the heating element 44 (FIG. 3) in advance of an anticipated feeding. In this manner, the aqueous medium in the heater 42 is at the appropriate temperature when a beverage is desired rather than having to wait for the heater 42 to warm up. Since loud crying often precedes the need for infant formula, the machine 10 is configured to respond to such sound cue and activate the heating element in preparation to formula being needed. As a result, the machine 10 will be ready to dispense a beverage by the time a parent has reached the room with the crying infant and the machine 10.

Liquid Concentrate

In a preferred form, the cartridges 12 will contain a liquid concentrate of an infant formula or other child's beverage having, for example, a 2×, 3×, or a 4× concentration. Other concentration levels may also be used depending on the application. By one approach, the infant formula may be a whey formula, a soy formula, a high or low lactose formula, or other common infant formulas concentrated to the desired level. Preferably, the concentrated dairy or soy base would be formed from an ultrafiltration and diafiltration process. Such processing would permit flexibility in the concentration level depending on the delivery and/or cartridge size. By another approach, the liquid concentrate may also be other children's beverages, such as hot cocoa, dairy or soy based flavored beverages, juices, ciders, teas, and the like. Other children's beverages, drinks, or liquid comestibles are also possible. If desired, these beverages can be fortified with vitamins or nutrients (i.e., vitamin E, C, and the like). Table 2 below provides an example of a flavored dairy product that is suitable for use in the cartridges 12. In this example, the dairy product may be flavored with either a vanilla or strawberry flavor; however, any desired flavor may also be used.

TABLE 2

Flavored Dairy Products

| Ingredient | % |
|---|---|
| Sweetener | 0.1 |
| Flavor | 0.03-0.1 |
| Dairy Base | 99.8-99.87 |

Cartridges

Turning to FIGS. 8 to 17, exemplary cartridges 12 are illustrated in more detail that are configured for use with the beverage preparation machine 10. The cartridges 12 are generally configured to produce infant formula and other children's beverages from a liquid concentrate upon being diluted with an aqueous medium provided by the machine 10. By one approach, the cartridges 12 are similar to that described in U.S. patent application Ser. No. 10/763,444 and International Publication No. WO 2004/064582, which are incorporated herein by reference in its entirety; therefore, only differences therefrom will be described below.

With infant formula it is generally preferred to have a beverage with little or no foam or bubbles or, alternatively, less stable foams that disappear relatively quickly. For example, it is preferred that an infant's beverage in the receiving receptacle has less than about 20 percent foam by volume of beverage, more preferably less than about 5 percent foam by volume of beverage, and even more preferably essentially no foam by volume of beverage. With children's beverages, on the other hand, up to about 10 percent by volume foam would be acceptable in some cases.

As a result, the cartridges 12 may also include modifications over that disclosed in Ser. No. 10/763,444 and/or WO 2004/064582 effective to reduce and minimize the amount of foaming produced in the receiving receptacle. In general, the amount of foam may be reduced by minimizing the incorporation of air in the beverage during its formation/dilution such as by reducing or minimizing turbulent flow and/or mixing in the presence of air. In this regard, the cartridge 12 could have larger apertures or openings through which the beverage and/or aqueous medium flows, an increased number of such apertures or openings to increase the overall cross-sectional area for the product flow, and/or the cartridge 12 could eliminate any eductor or other structures configured to increase foam.

In addition, the shape and design of any cartridge apertures could also be modified effective to minimize form. For example, the cartridge may be modified by removing any sharp angles or edges within the product flowpath, and the corners of any apertures or openings could be configured with wide angles and curved/rounded profiles to minimize turbulent flow.

Referring to FIGS. 8 to 12, an exemplary form of the cartridges 12 are shown including an inner member 100 and an outer member 102 providing a first type of beverage flowpath configured to minimize foaming. In this exemplary form, the inner member 100 includes flow apertures 104 having a shape 106 effective to minimize turbulent flow within the cartridge as the aqueous medium is mixed with the infant formula or other child's beverage contained within the cartridge. In general, the shape 106 includes smooth, curved, or rounded edges 108 configured to provide a smooth flow transition between the inner and outer members 100 and 102, respectively.

Turning to FIGS. 13 to 16, another exemplary form of the cartridges 12 are shown including the inner member 100 and the outer member 102 providing a second type of beverage flowpath configured to minimize foaming. In this form, the inner member 100 includes enlarged flow apertures 104 having an increased cross-sectional area, which is also effective to minimize turbulent flow within the cartridge as the aqueous medium is mixed with the contained infant formula or other child's beverage.

Minimizing of Beverage Foaming via Machine Settings

If desired, the amount of foaming of the beverage may also be controlled by varying certain machine operating parameters by an amount effective to reduce foaming or to produce less stable form. By one approach, varying the product temperature and/or pump speeds can be effective to minimize the level of foam and/or produce less stable foam. In general, slower pump speeds result in reduced foaming and/or less stable foam.

In general, it was discovered that high temperatures, high flow rates, and short, fast purge cycles created relatively stable foam, which was up to about 20 percent by volume of the beverage. Reducing the pump speeds, which resulted in a slower flow rate, and longer, slower purge settings, were generally able to reduce the level of foam by about 20 to about 30 percent or down to about less than about 5 to about 10 percent by volume of the beverage. In addition, such foams produced at slower rates were less stable than foams produced at higher flow rates, so they disappeared more quickly.

In addition, reduced aqueous medium temperatures also generally reduced the level of foam, but such lower temperatures also reduced the final beverage temperature in the receiving receptacle 19. As a result, machine parameters to reduce the level and stability of foam are also generally balanced with other factors, such as having the desired final beverage temperature and having low residual product left in the cartridge 12 after the beverage preparation/dilution process. For example, Tables 3 and 4 provide exemplary operating parameters and the resultant effect on beverage foaming when using a beverage preparation machine as disclosed in U.S. application Ser. No. 10/763,444.

TABLE 3

Evaluation of Infant formula foaming

| Machine/Cartridge Setting | | Prepared Product dispensed in receptacle (formula + water) | | | | |
|---|---|---|---|---|---|---|
| | | Weight of Formula in | Product left in | volume | | |
| Machine Settings | Cartridge modification | Cartridge (g) | Final wt (g) | cartridge (g) | foam (mL) | liquid (mL) | Temp (F.) |
| Espresso | — | 49.9 | 108.77 | 2.36 | 30 | 100 | 136 |
| Latte | — | 56.0 | 133.66 | 2.5 | 35 | 120 | 141 |
| Espresso | additional aperture | 56.0 | 111.41 | 2.36 | 25 | 108 | 127 |
| Manual Fill | — | 56.0 | 109 | 2.48 | 35 | 110 | 132 |
| Espresso | Increased size of apertures | 55.6 | 99.73 | — | <20, very unstable | 110 | — |
| Espresso, no purge | — | 56.0 | — | — | 25 | — | — |

TABLE 4

Evaluation of formula type and machine setting on foaming.

| Machine Settings | | | | | | | Final Product | | | | |
|---|---|---|---|---|---|---|---|---|---|---|---|
| | Flow | | | Initial Pod | | | Final | Residual | Foam, | | Brew |
| Temp, F. | Speed | Purge | Pump | Type | Conc. | Wt, g | wt, g | product, g | mm | Temp F. | time |
| 94 F. | fast, 10 sec | fast-long | 100% | Liquid Conc. | 100% | 56 | 111.4 | 2.4 | 1.7 | 139.2 | |
| 94 F. | slow, no soak | slow-short | 20% | Liquid Conc. | 100% | 56 | 99.9 | 8.9 | 1.2 (unstable) | 130.9 | 18.38 |
| 94 F. | slow, no soak | slow-long | 20% | Liquid Conc. | 100% | 56 | 107 | 3 | 1.65 | 127.3 | 18.56 |
| 88 F. | slow, no soak | slow-long | 20% | Liquid Conc. | 100% | 56 | 110.2 | 3.4 | 1.3 | 120.5 | 18.99 |
| 88 F. | slow, no soak | slow-long | 20% | Powder | About 3X w/ water | 53 | 136.9 | 2.9 | 1.5 | 138.5 | ~28 |
| 89 F. | slow, no soak | slow-long | 120% | Powder | About 3X w/ water | 53 | 138.8 | 2.6 | 1.2–1.4 | 133 | 25.5 |
| 88 F. | slow, no soak | slow-long | 20% | Powder | About 3X w/ water | 54 | 167.9 | 3.3 | 1.3–1.5 | 144 | 28.3 |
| 88 F. | slow, no soak | slow-long | 20% | Diluted Cereal | 2:1, Water:cereal | 53 | 63.9 | 43 | 0.1 | 148.9 | 17.56 |

Improved Cleaning

With infant formulas, it is important that formula is prepared and dispensed through clean portions of the machine 10 to minimize contamination in the final product. In this regard, the machine 10 is configured to facilitate quick and easy cleaning. In one regard, the machine 10 could include an optional disposable shield or cover that would fit over or through the piercing mechanism 32 in the cartridge head 14 to minimize and prevent contamination of the piercing mechanism 32 by generally shielding this mechanism from the beverage flow path.

Figure 17:
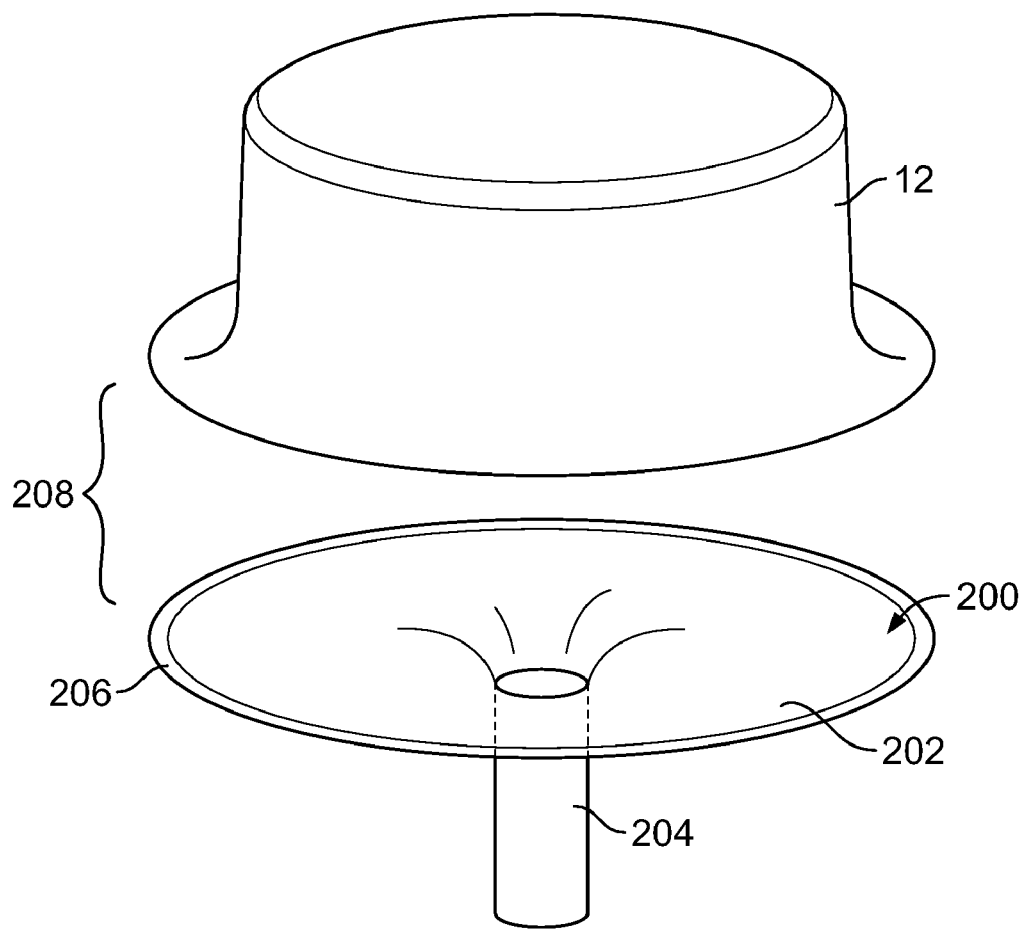
FIG. 17 is a perspective view of an exemplary protective member for a cartridge.

For example, as illustrated in FIG. 17, an optional protective member 200 may be provided that is arranged and configured to be joined with the cartridge 12. In one form, the protective member 200 includes a disk portion 202 and a funnel portion 204. The disk portion 202 would be configured to be attached to the bottom of a cartridge 12 via an attachment mechanism 206 (such as by a snap fit, adhesive, clamping, or an interference fit to suggest but a few examples—there may also be other types of attachment mechanisms). In use, the protective member 200 generally directs beverage flowing out of the cartridge 12 into the funnel portion 204 and then into the receiving receptacle 19 without the beverage contacting the piercing mechanism. In one form, the protective member 200 is constructed from a flexible and/or resilient material such that it can easily be deformed, bent, and/or shaped as needed to be attached to the cartridge 12 and/or for the combined cartridge and protective member assembly 208 to be inserted into the machine cartridge head 14.

In use, the funnel portion 204 would be received within or through the piercing mechanism 32 of the machine cartridge head 14, for example, and minimize, and preferably, prevent any discharging beverage from contacting the piercing mechanism 32. In this regard, the piercing mechanism 32 would generally not need to be cleaned because the funnel portion 204 of the protective member 200 would contact the dispensing beverage rather than the piercing mechanism 32. When the cartridge 12 is disposed of after use, the protective member is also disposed of along with the cartridge or removed for cleaning prior to further use.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

It will be also understood that various changes in the details, materials, and arrangements of parts and components which have been herein described and illustrated in order to explain the nature of the invention may be made by those skilled in the art within the principle and scope of the invention as expressed in the appended claims.

What is claimed is:

1. A beverage preparation machine comprising:
    a tank sized to contain at least a predetermined volume of an aqueous medium at a first temperature;
    a chamber configured to receive a cartridge containing a predetermined volume of a liquid concentrate at a second temperature;
    a metering device to form a beverage by diluting the predetermined volume of liquid concentrate with the predetermined volume of aqueous medium;
    a discharge arranged to direct the beverage into a receiving receptacle; and
    a controller operative to sense the first temperature and to select a heater temperature based on a ratio of the predetermined volume of aqueous medium to the predetermined volume of liquid concentrate such that the beverage in the receiving receptacle will consistently and reliably be delivered at a predetermined final temperature that is plus or minus about 5° F. from the predetermined final temperature; and
    a sensor to measure the second temperature of the liquid concentrate within the cartridge, and wherein the controller varies the heater temperature based on the sensed second temperature, and wherein the sensor is disposed on the cartridge.

2. The beverage preparation machine of claim 1, wherein the liquid concentrate is a concentrated liquid infant formula and the beverage is approximately a single serving of an infant formula.

3. The beverage preparation machine of claim 1, further comprising an insulating material positioned within the beverage preparation machine to minimize pump noise.

4. The beverage preparation machine of claim 1, further comprising a device operative to provide sound.

5. The beverage preparation machine of claim 1, further comprising an illumination source.

6. The beverage preparation machine of claim 5, wherein the illumination source is positioned to direct illumination on a surface of a room in which the machine is placed.

7. The beverage preparation machine of claim 6, further comprising a stencil configured to move in front of the illumination source in order to direct a moving image on the room surface.

8. The beverage preparation machine of claim 6, wherein the illumination source is configured to move behind a stationary stencil in order to direct a moving image on the room surface.

9. The beverage preparation machine of claim 5, wherein the illumination source is positioned to direct illumination towards the receiving receptacle.

10. The beverage preparation machine of claim 1, further comprising a sound activated sensor operative to provide the aqueous medium at the heater temperature upon the sound activated sensor detecting a sound.

11. The beverage preparation machine of claim 1, wherein the predetermined final temperature is about 95° F. to about 105° F.

12. The beverage preparation machine of claim 11, wherein the heater temperature is about 50° C. to about 60° C. when the ratio is 1:1.

13. The beverage preparation machine of claim 11, wherein the heater temperature is about 40° C. to about 50° C. when the ratio is 3:1.

14. The beverage preparation machine of claim 1, wherein the predetermined final temperature is about 115° F. to about 125° F.

15. The beverage preparation machine of claim 14, wherein the heater temperature is about 50° C. to about 60° C. when the ratio is about 6:1.

16. The beverage preparation machine of claim 14, wherein the heater temperature is about 57° C. to about 67° C. when the ratio is about 3:1.

17. The beverage preparation machine of claim 16, wherein the heater temperature is about 50° C. to about 60° C. when the ratio is about 4:1.

18. The beverage preparation machine of claim 1, wherein the controller selects the heater temperature based on the first temperature.

* * * * *

UNITED STATES PATENT AND TRADEMARK OFFICE
CERTIFICATE OF CORRECTION

PATENT NO. : 7,863,546 B2
APPLICATION NO. : 11/616749
DATED : January 4, 2011
INVENTOR(S) : Jamie Allen Hestekin et al.

It is certified that error appears in the above-identified patent and that said Letters Patent is hereby corrected as shown below:

Column 14, line 42, delete "claim 16" and insert --claim 14-- therefor.

Signed and Sealed this
Seventeenth Day of May, 2011

David J. Kappos
*Director of the United States Patent and Trademark Office*